United States Patent
Schill

(10) Patent No.: US 8,837,171 B2
(45) Date of Patent: Sep. 16, 2014

(54) METHOD FOR OPERATING A DC/DC CONVERTER CIRCUIT CONFIGURATION AND DC/DC CONVERTER CIRCUIT CONFIGURATION

(75) Inventor: Christoph Schill, Ravensburg (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 578 days.

(21) Appl. No.: 13/177,635

(22) Filed: Jul. 7, 2011

(65) Prior Publication Data

US 2012/0008347 A1    Jan. 12, 2012

(30) Foreign Application Priority Data

Jul. 10, 2010  (DE) .......................... 10 2010 026 794

(51) Int. Cl.
*H02M 3/335*    (2006.01)

(52) U.S. Cl.
USPC ..................................... 363/21.01; 363/21.12

(58) Field of Classification Search
CPC .................................................. H02M 3/33507
USPC ........... 363/21.01, 21.12, 21.18, 56.01, 56.05
See application file for complete search history.

(56) References Cited

U.S. PATENT DOCUMENTS

| | | | | |
|---|---|---|---|---|
| 4,593,347 | A | * | 6/1986 | Peruth et al. ............... 363/21.08 |
| 5,544,949 | A | | 8/1996 | Schmitt et al. |
| 6,507,500 | B2 | | 1/2003 | Liang |
| 7,394,237 | B2 | * | 7/2008 | Chou et al. .................... 323/299 |
| 2005/0094420 | A1 | * | 5/2005 | Nakao et al. ............... 363/21.12 |

FOREIGN PATENT DOCUMENTS

| | | |
|---|---|---|
| DE | 33 12 209 A1 | 10/1984 |
| DE | 42 28 640 A1 | 3/1994 |
| DE | 44 10 738 A1 | 10/1994 |
| DE | 44 33 459 A1 | 3/1996 |
| DE | 101 24 411 A1 | 7/2002 |

OTHER PUBLICATIONS

Infineon technologies, "ICs for Consumer Electronics Controller for Switch Mode Power Supplies Supporting Low Power Standby and Power Factor Correction", Jan. 14, 2000, pp. 1-28.

* cited by examiner

*Primary Examiner* — Matthew Nguyen
(74) *Attorney, Agent, or Firm* — Laurence A. Greenberg; Werner H. Stemer; Ralph E. Locher

(57) ABSTRACT

A DC/DC converter circuit configuration contains a rectifier configuration, an inductance and at least one circuit breaker for switching the inductance on its input side. When controlling the circuit configuration, an off time of the circuit breaker is variably changed on the basis of the output power of the circuit configuration and the circuit breaker is respectively switched on in the region of a minimum of a voltage curve across the circuit breaker in order to minimize the switching losses and achieve a high level of efficiency.

10 Claims, 2 Drawing Sheets

METHOD FOR OPERATING A DC/DC CONVERTER CIRCUIT CONFIGURATION AND DC/DC CONVERTER CIRCUIT CONFIGURATION

CROSS-REFERENCE TO RELATED APPLICATION

This application claims the priority, under 35 U.S.C. §119, of German application DE 10 2010 026 794.5, filed Jul. 10, 2010; the prior application is herewith incorporated by reference in its entirety.

BACKGROUND OF THE INVENTION

Field of the Invention

The present invention relates to a method for operating a DC/DC converter circuit configuration, for example a flyback converter, a boost converter or a buck converter.

In DC/DC converter circuit configurations (also referred to as switching converters for short), losses generally occur in the switching operation as a result of charge reversal of the parasitic stray capacitances in inductors or transformers and in power semiconductors. These losses may become large, in particular in switching converters which operate at very high input voltages, since the losses are proportional to the square of the applied voltages.

An attempt is therefore made to keep these switching losses as low as possible by use of suitable measures.

Pulse width modulation at a fixed switching frequency is a known standard method for controlling switching converters. In this case, the output power is reduced by reducing the pulse width of the circuit breaker. In this case, the current in the circuit breaker and finally also the transmitted power fall. However, the number of switching operations remains the same in this method, which is why the switching losses are disproportionately large at partial load.

A known approach to reducing the switching losses is also the so-called Variable Off Time method. In this control method, the peak current in the circuit breaker is left constant at partial load and the power is reduced by reducing the switching frequency, that is to say by increasing the off time of the circuit breaker. The number of switching operations in the switching converter is reduced to the minimum required in each case in this manner. The switching losses thus fall in proportion to the output power, which is why the efficiency remains constant over a wide range even at partial load. However, the switching losses at full load remain high since the number of switching operations cannot be reduced here.

A switching converter in which the frequency and/or the duty ratio of the clock signal for switching the circuit breaker on and off is/are changed in order to control the output power of the circuit configuration is described, for example, in published, non-prosecuted German patent application DE 44 10 738 A1.

Another known approach to reducing switching losses in switching converters involves switching on the circuit breaker exactly at the moment at which the voltage across the circuit breaker becomes zero (so-called resonant switching). The stray capacitances of the circuit configuration do not have any charge at this time, which is why no losses occur either. In common switching converter concepts which operate according to this control method, the switching frequency first of all increases at partial load. However, since the circuit breaker is respectively switched on at the time of the zero crossing of the voltage, no additional losses are produced by the increased switching frequency. Switching converters which are operated using such a control method are disclosed, for example, in German patent DE 42 28 640 B4 and published, non-prosecuted German patent application DE 101 24 411 A1, corresponding to U.S. Pat. No. 6,507,500.

On account of new standards for photovoltaic systems, the internal power supply for solar inverters must be switched over from mains operation to solar generator operation. For this purpose, provision must be made of a wide-range switching converter which operates with high input voltages up to 1,000 V and has a high level of efficiency.

However, in the case of flyback converters with a very high input voltage in particular, the return voltage must be limited to a relatively small value when discharging the converter transformer in order to avoid the circuit breaker being destroyed by overvoltage. This results in the voltage across the circuit breaker not being able to oscillate down to zero after the flyback converter transformer has been discharged. Perfect zero crossing switching is thus impossible in this application. Switching losses therefore always occur when switching on the circuit breaker; an increase in frequency at partial load, for example, is therefore unfavourable.

SUMMARY OF THE INVENTION

It is accordingly an object of the invention to provide a method for operating a DC/DC converter circuit configuration and a DC/DC converter circuit configuration which overcome the above-mentioned disadvantages of the prior art methods and devices of this general type, which provides an improved method for operating the DC/DC converter circuit configuration that can reduce or minimize the switching losses even in DC/DC converter circuit configurations in which zero crossing switching is impossible or is not possible in every operating state.

In the method for operating a DC/DC converter circuit configuration which has a rectifier configuration, an inductance and at least one circuit breaker for switching the inductance on its input side, an off time of the circuit breaker is variably changed on the basis of the output power of the circuit configuration. In this case, according to the invention, the circuit breaker is respectively switched on in the region of a minimum of a voltage curve across the circuit breaker.

In accordance with the method according to the invention, the switching losses of the DC/DC converter circuit configuration are minimized by using the Variable Off Time method in combination with switching on the circuit breaker in the region of a voltage minimum across the circuit breaker. This method can be used in a particularly advantageous manner in switching converters in which zero crossing switching is impossible or is not possible in every operating state. The method is therefore advantageously suitable, for example, in the case of photovoltaic systems in which switching converters operate with high input voltages.

The method according to the invention makes it possible to achieve a high level of efficiency for the DC/DC converter circuit configuration by controlling the output power by a variable off time (that is to say frequency change) of the circuit breaker and, at the same time, switching on the circuit breaker at an optimum time.

The method can be implemented, for example, by simply modifying the Variable Off Time method by adding external circuitry to the control device conventionally used for the Variable Off Time method in order to achieve the desired switching of the circuit breaker in the region of a voltage minimum. Alternatively, the method can also be naturally implemented by a specially adapted control device. Such a specially adapted control device may be configured, for example, in such a manner that it directly or indirectly detects the voltage profile across the circuit breaker and carries out the Variable Off Time method taking into account this voltage detection.

The Variable Off Time method is modified, according to the invention, in such a manner that the circuit breaker is switched on only at the times at which the voltage across the circuit breaker is (virtually) minimal. In order to be able to supply any desired output power despite the switch-on times which are discrete in this manner, it is optionally possible to switch back and forth between adjacent switch-on times, thus resulting on average in the desired output power.

The operation of switching on the circuit breaker "in the region of a minimum" of a voltage curve across the circuit breaker should not be restricted to a switching-on operation exactly at the voltage minimum; it can also be carried out in the vicinity of the voltage minimum.

Depending on the design and use of the DC/DC converter circuit configuration, the "inductance" may be, for example, an inductor or a primary winding of a transformer.

In one refinement of the invention, the switch-on time of the circuit breaker is determined as the point of intersection between a monotonously increasing ramp voltage curve and a modified feedback voltage curve. The modified feedback voltage curve being produced by adding the voltage curve across the circuit breaker to an averaged feedback voltage. The averaged feedback voltage being determined by averaging a difference between an output voltage of the circuit configuration and a desired value of the output voltage of the circuit configuration.

In an alternative refinement of the invention, the switch-on time of the circuit breaker is determined as the point of intersection between a modified ramp voltage curve and an averaged feedback voltage. The modified ramp voltage curve is produced by subtracting the voltage curve across the circuit breaker from a monotonously increasing ramp voltage curve. The averaged feedback voltage is determined by averaging a difference between an output voltage of the circuit configuration and a desired value of the output voltage of the circuit configuration.

In the case of a switching converter which operates according to the Variable Off Time method for example, the method according to the invention can therefore be carried out in a simple manner by adding the voltage across the circuit breaker to the control loop or the averaged feedback voltage or by subtracting the voltage across the circuit breaker from the ramp voltage.

A conventional method for switching on a circuit breaker at the voltage minimum involves detecting the zero crossing of the oscillation and then switching on the circuit breaker after a time delay of ¼ period. In this case, however, this time delay must be individually adapted to the oscillation frequency occurring in the circuit configuration. In the method according to the invention, however, the circuit breaker is switched on automatically at the appropriate time (in the region of the voltage minimum) independently of the oscillation frequency according to the two alternative refinements.

The "monotonously increasing" ramp voltage curve must increase monotonously but the increase need not necessarily be continuous or even linear. For example, the increase may also be temporarily stopped, with the result that the ramp voltage remains at a constant value for a certain time. Furthermore, in the case of an extremely low output power for example, the ramp voltage can also remain at a maximum value after reaching the latter until the falling modified feedback voltage reaches this ramp voltage.

The start (of the increase) of the ramp voltage may take place at different times. In one possible refinement of the invention, the ramp voltage curve begins at a switch-off time of the circuit breaker, for example. Selecting the starting time of the ramp voltage curve makes it possible to influence when the circuit breaker is switched on at the earliest. In other words, the clock frequency may have an upper limit imposed on it in this manner.

In another refinement of the invention, the averaged feedback voltage and/or the ramp voltage curve can be limited to a predefined voltage value. Limiting the averaged feedback voltage to a minimum value makes it possible to influence when the circuit breaker is switched on at the earliest. In other words, the clock frequency may also have an upper limit imposed on it in this manner.

In yet another refinement of the invention, the ramp voltage curve and/or the averaged feedback voltage is/are modulated. Modulating the ramp voltage or the feedback voltage makes it possible to produce jitter in the clock frequency in order to reduce radio interference, for example.

The DC/DC converter circuit configuration is in the form of a flyback converter, a boost converter or a buck converter, for example.

According to a second aspect, the present invention also relates to a DC/DC converter circuit configuration containing a rectifier configuration, an inductance, at least one circuit breaker for switching the inductance on its input side, and a control device for driving the circuit breaker in order to carry out the above-described method of the invention.

According to a third aspect, the DC/DC converter circuit configuration can be used in a particularly advantageous manner in a photovoltaic system for supplying energy to a solar inverter of the photovoltaic system on the side of the solar generator.

Other features which are considered as characteristic for the invention are set forth in the appended claims.

Although the invention is illustrated and described herein as embodied in a method for operating a DC/DC converter circuit configuration and a DC/DC converter circuit configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The invention is described in more detail below using the example of a flyback converter. However, the operating or control method according to the invention is likewise suitable for other DC/DC converter circuit configurations, for example boost converters and buck converters.

Figure 1:
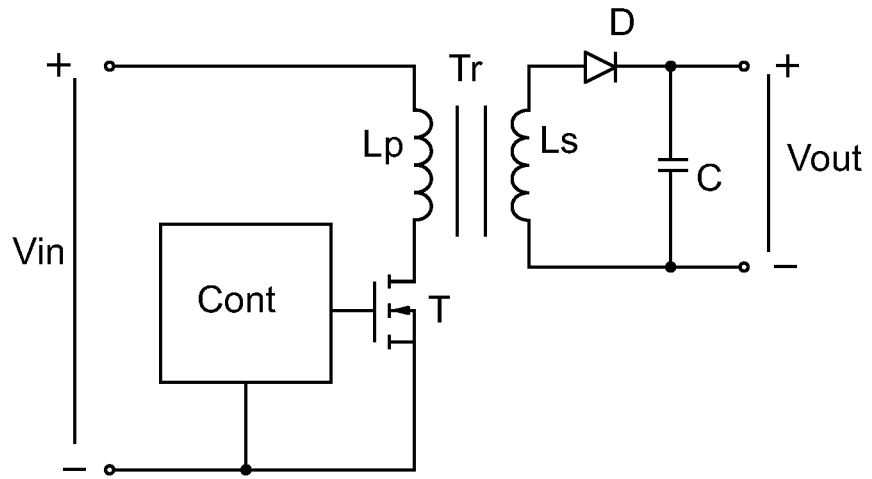
FIG. 1 is a simplified block diagram for explaining a basic design of a flyback converter in which a method according to the invention can be used.

As illustrated in FIG. 1, a flyback converter in principle contains, on its input side, an inductance Lp in the form of a primary winding of a transformer Tr and a circuit breaker T for switching this inductance Lp on and off. A transistor, especially a MOSFET, can be used as the circuit breaker T, for example. On the output side of the flyback converter, the latter contains, in addition to the secondary winding Ls of the transformer Tr, a rectifier configuration formed of a freewheeling diode D and a capacitance C.

In a known manner, the flyback converter converts a DC input voltage Vin into a DC output voltage Vout. In order to reduce the switching losses, the circuit configuration also contains a control device Cont, for example in the form of a microcontroller, which drives the circuit breaker T in a special manner, as described below.

Figure 2:
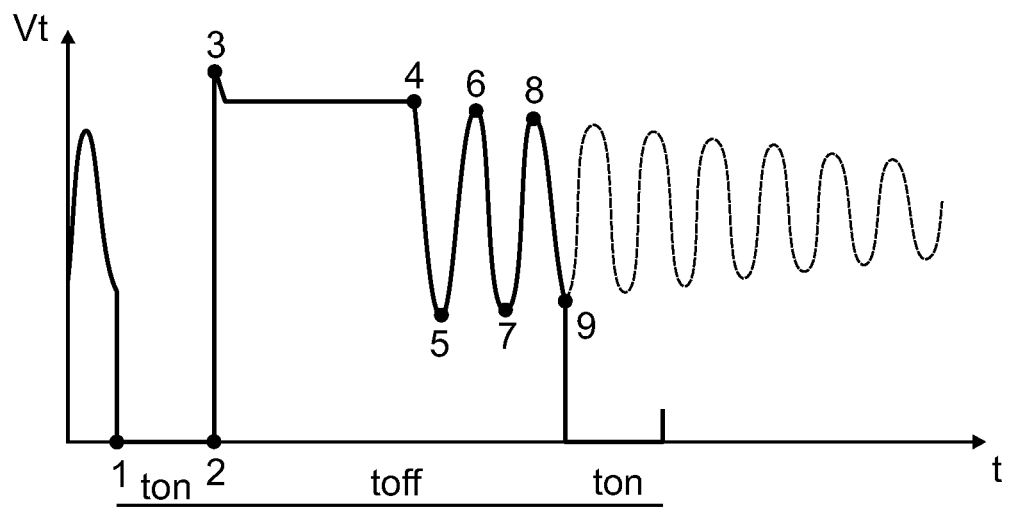
FIG. 2 is a graph showing a temporal profile of a voltage curve across a circuit breaker.

During operation of the flyback converter shown in FIG. 1, a voltage profile Vt, as illustrated by way of example in FIG. 2, exists across the circuit breaker T.

At time 1, the circuit breaker T is switched on, with the result that the primary winding Lp of the flyback converter transformer is charged with energy. After an on time ton, the circuit breaker T is switched off at the time 2. The current which continues to flow in the primary winding Lp then charges the stray capacitances of the circuit breaker T and of the transformer Tr. After the stray capacitances have been charged, the energy stored in the transformer Tr begins to discharge into the secondary side (time 3).

At the time 4, the energy in the transformer Tr has completely discharged into the secondary circuit of the flyback converter. A weakly attenuated oscillation which is determined by the stray capacitances and the inductance of the transformer Tr then results.

At the times 4, 6, 8, . . . , the voltage Vt across the circuit breaker T reaches a maximum in each case. If the circuit breaker T were switched on here, maximum switching losses would be produced. In contrast, at the times 5, 7, 9, . . . , the voltage Vt reaches a minimum. In order to minimize the switching losses in the flyback converter, the circuit breaker T should be switched on at these times. The emitted interference of the flyback converter then also falls as a side effect.

Since the method for controlling the flyback converter according to the invention by means of the control device Cont is based on the conventional Variable Off Time method, the latter shall first of all be briefly explained.

Figure 3:
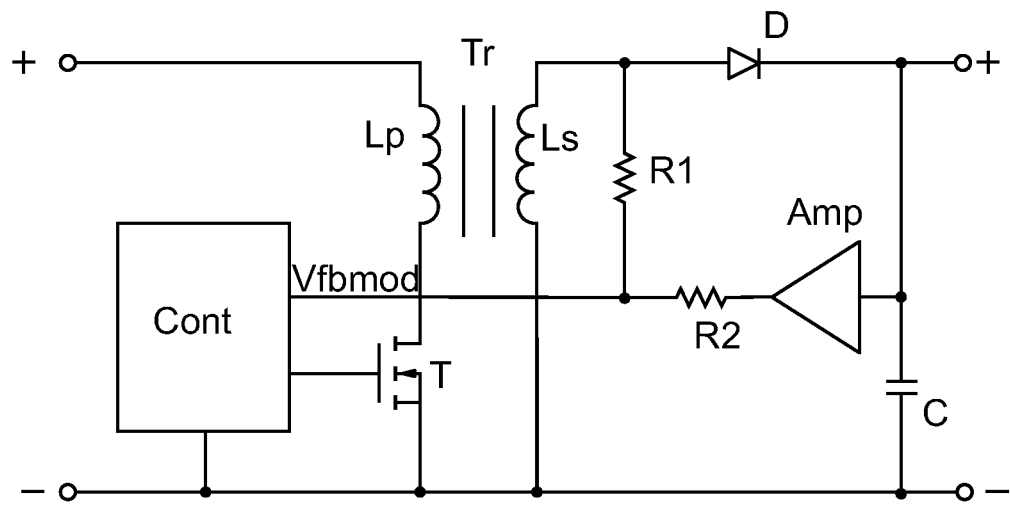
FIG. 3 is a simplified block diagram of the flyback converter according to one preferred exemplary embodiment of the invention.

In order to carry out the Variable Off Time control method, the control device Cont is supplied with the difference between the output voltage Vout of the flyback converter and a desired value for this output voltage in the form of an averaged feedback voltage Vfbav via a resistor R2, for example by an operational amplifier Amp (see FIG. 3). In addition, the control device Cont produces a monotonously increasing ramp voltage curve Vramp using a ramp generator or is supplied with such a curve by an external ramp generator.

In the conventional Variable Off Time method, the control device Cont compares the ramp voltage Vramp with the averaged feedback voltage Vfbav. As soon as these two voltage values Vramp and Vfbav become the same, a new clock cycle is started, that is to say the circuit breaker T is switched on.

In the case of a falling output power of the flyback converter, the off time toff of the circuit breaker T is increased in order to reduce the transmitted energy and to keep the output voltage Vout constant thereby. If the output power falls, the output voltage Vout of the flyback converter first of all increases somewhat. As a result, the averaged feedback voltage Vfbav also increases. The point of intersection between the monotonously increasing ramp voltage curve Vramp and the constant feedback voltage curve Vfbav, that is to say the time for switching on the circuit breaker T, is thus shifted to the right in FIG. 2. This in turn means that the off time toff of the circuit breaker T is increased or the clock frequency is reduced. As a result, the power transmitted by the flyback converter falls and its output voltage Vout is controlled to the desired value.

It can be seen from FIG. 2 that the switching losses of the flyback converter vary depending on the magnitude of the voltage Vt across the circuit breaker T at the time at which the latter is switched on. The point of intersection between the two voltage curves Vramp and Vfbav and thus the switch-on time can be favourable (voltage Vt across the circuit breaker T small->small switching losses) or unfavourable (voltage Vt across the circuit breaker T high->large switching losses).

In order to ensure that the circuit breaker T is respectively switched on in the region of the voltage minima of Vt, the Variable Off Time method is modified as follows.

Figure 4:
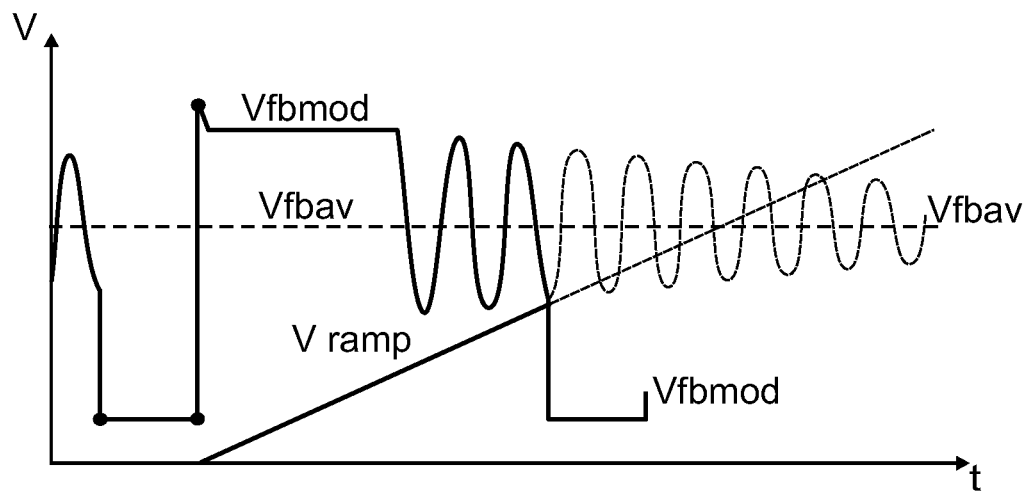
FIG. 4 is a voltage/time graph for explaining the method of operation of the method according to the invention.

As illustrated in FIG. 3, an image of the voltage Vt across the circuit breaker T is taken from the secondary winding Ls of the transformer Tr and is added to the output signal from the operational amplifier Amp, that is to say to the averaged feedback voltage Vfbav, via the resistor R1 and is supplied to the control device Cont as a modified feedback voltage Vfbmod. This modified feedback voltage curve Vfbmod is illustrated in FIG. 4 together with the ramp voltage curve Vramp and the averaged feedback voltage Vfbav.

The switch-on time of the circuit breaker T is now determined as the point of intersection between the monotonously increasing ramp voltage curve Vramp and the modified feedback voltage curve Vfbmod. As is clear from FIG. 4, this point of intersection always lies in the region of a minimum of the modified feedback voltage curve Vfbmod and thus also a minimum of the voltage Vt across the circuit breaker T. As a result, the switching losses when switching on the circuit breaker T can also be minimized. Although the voltage curve Vt across the circuit breaker T does not show any zero crossings, the switching losses of the flyback converter can nevertheless be minimized with the control method according to the invention.

In the case of a changing output power of the flyback converter, the switch-on time jumps from minimum to minimum of the voltage curve Vfbmod. If the output power does not exactly match constant operation of the flyback converter with a particular minimum, a constant change between adjacent voltage minima is automatically carried out, thus resulting on average in the desired output power.

This control method makes it possible to switch on the circuit breaker T at the voltage minimum even after 20 or more oscillation periods of the voltage Vt.

The ramp voltage curve Vramp must increase monotonously but the increase need not necessarily be continuous or linear. For example, the increase may also be temporarily stopped, with the result that the ramp voltage Vramp remains at a constant value for a certain time. Furthermore, in the case of an extremely low output power for example, the ramp voltage Vramp can also remain at a maximum value after reaching the latter until the falling modified feedback voltage Vfbmod reaches this ramp voltage Vramp.

The start of the ramp voltage curve Vramp may be selected at different times. In the exemplary embodiment from FIG. 4, the ramp voltage Vramp begins at a switch-off time of the circuit breaker T, for example. Selecting the starting time of the ramp voltage curve Vramp and limiting the averaged feedback voltage Vfbav make it possible to influence when the circuit breaker T is switched on at the earliest. The clock frequency may thus have an upper limit imposed on it in this manner.

Furthermore, modulating the ramp voltage or the feedback voltage makes it possible to produce jitter in the clock frequency of the circuit breaker T in order to reduce radio interference, for example.

Whereas, in the above exemplary embodiment from FIGS. 3 and 4, the voltage Vt across the circuit breaker T was added to the averaged feedback voltage Vfbav in order to compare the modified feedback voltage Vfbmod produced in this manner with the ramp voltage curve Vramp, it is also possible, as an alternative to the example, to subtract the voltage Vt across the circuit breaker T from the ramp voltage Vramp in order to compare the modified ramp voltage Vrampmod produced in this manner with the averaged feedback voltage Vfbav.

The invention claimed is:

1. A method for operating a DC/DC converter circuit configuration, the DC/DC converter circuit configuration having a rectifier configuration, an inductance and at least one circuit breaker for switching the inductance on an input side, which comprises the steps of:
variably changing an off time of the circuit breaker on a basis of an output power of the DC/DC converter circuit configuration;
respectively switching the circuit breaker on in a region of a minimum of a voltage curve across the circuit breaker;
determining a switch-on time of the circuit breaker as a point of intersection between a monotonously increasing ramp voltage curve and a modified feedback voltage curve;
producing the modified feedback voltage curve by adding the voltage curve across the circuit breaker to an averaged feedback voltage; and
determining the averaged feedback voltage by averaging a difference between an output voltage of the DC/DC converter circuit configuration and a desired value of the output voltage of the DC/DC converter circuit configuration.

2. A method for operating a DC/DC converter circuit configuration, the DC/DC converter circuit configuration having a rectifier configuration, an inductance and at least one circuit breaker for switching the inductance on an input side, which comprises the steps of:
variably changing an off time of the circuit breaker on a basis of an output power of the DC/DC converter circuit configuration;
switching the circuit breaker on in a region of a minimum of a voltage curve across the circuit breaker;
determining a switch-on time of the circuit breaker as a point of intersection between a modified ramp voltage curve and an averaged feedback voltage;
producing the modified ramp voltage curve by subtracting the voltage curve across the circuit breaker from a monotonously increasing ramp voltage curve; and
determining the averaged feedback voltage by averaging a difference between an output voltage of the DC/DC converter circuit configuration and a desired value of the output voltage of the DC/DC converter circuit configuration.

3. The method according to claim 1, wherein the monotonously increasing ramp voltage curve begins at a switch-off time of the circuit breaker.

4. The method according to claim 1, wherein at least one of the averaged feedback voltage or the monotonously increasing ramp voltage curve is limited to a predefined voltage value.

5. The method according to claim 1, which further comprises modulating at least one of the monotonously increasing ramp voltage curve or the averaged feedback voltage.

6. The method according to claim 1, which further comprises selecting the DC/DC converter circuit configuration from the group consisting of a flyback converter, a boost converter and a buck converter.

7. The method according to claim 2, wherein the monotonously increasing ramp voltage curve begins at a switch-off time of the circuit breaker.

8. The method according to claim 2, wherein at least one of the averaged feedback voltage or the monotonously increasing ramp voltage curve is limited to a predefined voltage value.

9. The method according to claim 2, which further comprises modulating at least one of the monotonously increasing ramp voltage curve or the averaged feedback voltage.

10. The method according to claim 2, which further comprises selecting the DC/DC converter circuit configuration from the group consisting of a flyback converter, a boost converter and a buck converter.

* * * * *